United States Patent
Lemler et al.

(10) Patent No.: US 12,494,966 B2
(45) Date of Patent: Dec. 9, 2025

(54) METHODS AND SYSTEMS FOR A FEATURE TOGGLE FRAMEWORK WITH ASYNCHRONOUS AUDIT TRAIL

(71) Applicant: Capital One Services, LLC, McLean, VA (US)

(72) Inventors: Christian Lemler, Livermore, CA (US); Christopher Huang, Santa Clara, CA (US); Brian Sunter, San Francisco, CA (US); Richard Stanley, Oakland, CA (US)

(73) Assignee: Capital One Services, LLC, McLean, VA (US)

( * ) Notice: Subject to any disclaimer, the term of this patent is extended or adjusted under 35 U.S.C. 154(b) by 101 days.

(21) Appl. No.: 18/601,570

(22) Filed: Mar. 11, 2024

(65) Prior Publication Data

US 2024/0305538 A1    Sep. 12, 2024

Related U.S. Application Data

(60) Provisional application No. 63/489,619, filed on Mar. 10, 2023.

(51) Int. Cl.
*H04L 41/085* (2022.01)
*G06F 16/23* (2019.01)
(Continued)

(52) U.S. Cl.
CPC ........ *H04L 41/085* (2013.01); *G06F 16/2358* (2019.01); *G06F 16/221* (2019.01); *H04L 41/22* (2013.01)

(58) Field of Classification Search
None
See application file for complete search history.

(56) References Cited

U.S. PATENT DOCUMENTS 11,075,803 B1 * 7/2021 Kapadia .............. H04L 63/0263
12,130,789 B1 * 10/2024 Lin ....................... G06F 16/219
(Continued)

FOREIGN PATENT DOCUMENTS

WO    WO-2008025503 A1 *  3/2008    ......... G06F 9/44505

OTHER PUBLICATIONS

M. Elkholy et al.; "Change Taxonomy: A Fine-Grained Classification of Software Change" in IT Professional, vol. 20, Issue. 4, pp. 28-36, Jul./Aug. 2018, DOI: 10.1109/MITP.2018.043141666; Retrieved online from IEEE Xplore on Aug. 6, 2025. (Year: 2018).*

(Continued)

*Primary Examiner* — Sandarva Khanal
(74) *Attorney, Agent, or Firm* — Foley & Lardner LLP

(57) ABSTRACT

Methods and systems for performing advanced analytics based on which features are active by correlating information based on temporal identifiers in feature databases. The method includes receiving a request to change a feature, determining metadata information for the feature, which may include a temporal indicator, a performance metric and a configuration of activation states, and generating a feature change record based on this metadata. The method includes receiving a request to determine a second performance metric, processing the request by determining a second feature change record, determining a configuration and generating a recommendation for display.

20 Claims, 4 Drawing Sheets

(51) Int. Cl.
  *H04L 41/22*   (2022.01)
  *G06F 16/22*   (2019.01)

(56) References Cited

U.S. PATENT DOCUMENTS

2009/0205011 A1* 8/2009 Jain .......................... G06F 8/65
                                                        726/1
2013/0204837 A1* 8/2013 Sabharwal ............ G06F 16/235
                                                        707/E17.005
2014/0082177 A1* 3/2014 Lemire ................... F24F 11/30
                                                        709/224
2020/0259722 A1* 8/2020 Kocberber .......... G06F 11/3409
2021/0034994 A1* 2/2021 Stocker .................... G06N 5/04

OTHER PUBLICATIONS

Dang et al.; 'Agent Based Decomposition for Service Change Request Analysis'; 2015 International Conference on Services Science; DOI 10.1109/ICSS.2015.38; Retrieved online from IEEE Xplore on Aug. 6, 2025. (Year: 2015).*

* cited by examiner

Feature Database
200

Feature Change Record 1 — 202

| Temporal Identifier | Performance metric | Feature | On/Off |
|---|---|---|---|
| | | Feature 1 | On |
| | | Feature 2 | Off |
| | | Feature 3 | On |
| | | Feature 4 | On |
| | | Feature 5 | On |
| | | Feature 6 | On |
| 208 | 210 | 212 | 214 |

Feature Change Record 2 — 204

| Temporal Identifier | Performance metric | Feature | On/Off |
|---|---|---|---|
| | | Feature 1 | Off |
| | | Feature 2 | Off |
| | | Feature 3 | On |
| | | Feature 4 | On |
| | | Feature 5 | On |
| | | Feature 6 | On |
| 216 | 218 | 220 | 222 |

Feature Change Record 3 — 206

| Temporal Identifier | Performance metric | Feature | On/Off |
|---|---|---|---|
| | | Feature 1 | On |
| | | Feature 2 | On |
| | | Feature 3 | On |
| | | Feature 4 | On |
| | | Feature 5 | On |
| | | Feature 6 | On |
| 224 | 226 | 228 | 230 |

FIG. 2

METHODS AND SYSTEMS FOR A FEATURE TOGGLE FRAMEWORK WITH ASYNCHRONOUS AUDIT TRAIL

CROSS REFERENCE TO RELATED APPLICATIONS

This application claims priority under 35 U.S.C. § 119 to U.S. Provisional No. 63/489,619, filed Mar. 10, 2023, which is expressly incorporated herein by reference in its entirety.

BACKGROUND

As technology moves toward the use of web applications to provide users with a more effective product, data management is likewise becoming a more important part of maintaining and improving computer systems. An audit log is a way to collect data regarding changes made to the features of a system in a synchronous manner, after having updated a database of these features with the change. Logging the data that arises from use of different features in the platforms is crucial for auditing and tracking a system's utility, but a challenge that has yet to be explored extensively is how to produce meaningful analytics from this information that can then be leveraged to improve the product and meet the application's goals.

SUMMARY

Systems and methods are described herein for novel uses and/or improvements to data collection and processing when toggling features in an application. As one example, methods and systems are described herein to allow a system to run advanced analytics based on which features are active at a given point in time.

For example, conventional feature auditing is done in a synchronous manner, where each change is logged at the time the change is made. Technically, this recording process is such that as a request for a change (e.g., toggling a feature) is received, the system writes the change to the feature database, and then writes the change to the audit log for the feature database. However, processing the change in this manner prevents advanced analytics to be performed on the audit trail because the audit trail lacks holistic information correlating performance across the features. Additionally, because the conventional solution is limited to synchronous information, the conventional audit trail precludes any temporal analysis of the system's features as a whole.

Systems and methods are described herein for overcoming this technical problem by maintaining an asynchronous record of changes for a feature database. For example, the system generates an asynchronous audit trail by maintaining a separate record of changes to each respective feature in a feature database in which the separate record includes metadata information about the feature change (e.g., when a feature was changed, by whom it was changed, and the functions and features available at the time of the change) and how usage of other features subsequently varies as a result of the change. Accordingly, the methods and systems provide the practical benefit of allowing the system to run advanced analytics based on which features are active by correlating performance information based on the temporal identifier, where a conventional audit log may only provide information about one feature's status.

In some aspects, systems and methods are designed to first receive a change request at a first time from a first device in a computer network for a first feature of a plurality of features, which may be for a mobile application. In response to receiving the first change request, the system may determine first metadata information for the first feature, wherein the first metadata information comprises a first configuration of activation states of features in the computer network, and a first performance metric for the computer network at the first time of the first change request. The system may generate a first feature change record in a feature database for the plurality of features, wherein the first feature change record is populated with the first metadata information. The system may also include receiving a user request, via a user interface, from a second device in the computer network, to determine a second performance metric that is higher than the first performance metric. The system can comprise processing the user request using the feature database by determining a second feature change record in the feature database, wherein the second feature change record comprises second metadata information, and wherein the second metadata information comprises the second performance metric, and wherein the second feature change record was generated after a first feature change record in response to receiving a second change request at a second time. In response to determining that the second metadata information comprises the second performance metric, the system may determine a second configuration of activation states of features in the computer network based on the second metadata information. The system may generate a recommendation for the second configuration for display on the user interface.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows illustrative data structures for the feature database, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
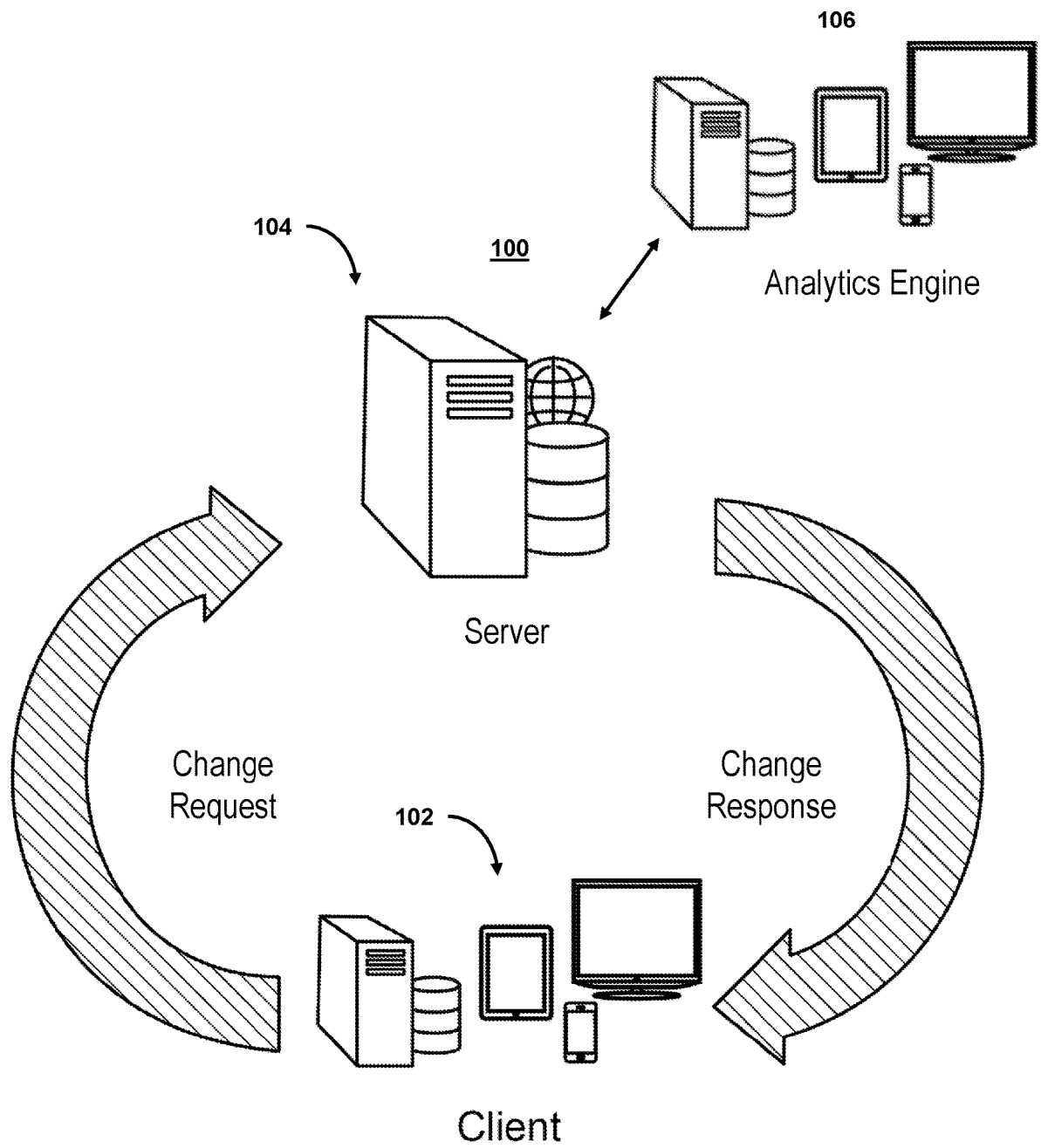
FIG. 1 shows an illustrative system environment for the exchange of change requests, responses and analysis, in accordance with one or more embodiments.

FIG. 1 shows illustrative system environment 100 for the exchange of change requests, responses and analysis, in accordance to one or more embodiments. For example, as shown in FIG. 1, client devices 102 may issue change requests to server 104. In response, server 104 may issue change responses. Client devices 102 and server 104 may operate in a client-server model in which a distributed application structure partitions tasks or workloads between the providers of a resource or service, called servers, and service requesters, called clients. As further shown in FIG. 1, server 104 may interface with a second device, which in some embodiments may be an analytics engine 106. In some embodiments, the information that server 104 communicates with analytics engine 106 may include a temporal indicator of the time of the change request, as well as a performance metric, and a current description of the activation state of other features in the system. By communicating this metadata information to analytics engine 106 asynchronously upon a user request from analytics engine 106, the analytics engine 106 may perform advanced analytics based on the metadata information provided by server 104. Analytics engine 106 may subsequently process the data, for example using a machine learning algorithm, to improve the performance of the system. As such, the computer network may leverage metadata information correlated in time across all features in order to provide an advanced way to perform analytics on the system, in a manner unachievable in conventional synchronous audit logs, wherein records are for single features and timesteps.

As referred to herein, "computer network" may comprise two or more devices that are connected to one another for the purpose of communicating data electronically, such as numerical values, temporal indicators, alphanumeric information, lists of Boolean values, signals, or any other type of information. Devices may include any unit of physical hardware or equipment that provides one or more computing functions within a computer network. Devices may provide input to the network, accept output, or both. A device can be any electronic element with some computing ability that supports the installation of firmware or third-party software. Devices may, for example, include smartphones, computers, tablets or smartwatches, or any other element that may provide input or accept output to the network. Devices may exhibit a user interface.

As referred to herein, "audit log" may comprise a document or file that records an event in a computer network. Audit logs may record the occurrence of an event, the time at which it occurred, the responsible user or service, and the impacted entity, typically as a sequence of activities. Audit logs typically capture changes sequentially and synchronously, precluding a system-wide analysis of the changes. The events that may be recorded include, for example, the activation or deactivation of a feature.

As referred to herein, "distributed application" should be understood to mean an application that is comprised of multiple clients that communicate with servers or machines throughout a computer network. In this architecture, information processing is not confined to a single device; rather it is distributed over several independent devices. For example, a client-server model that allows for a multi-tier architecture enables and manages communication between the functions of the computer network regardless of their network location. For example, different components of the distributed application may reside on various devices.

As referred to herein, "analytics engine" should be understood to mean any device or a network that allows for analytics to be performed on the computer network. Analytics may include any information resulting from the systematic analysis of data or statistics. For example, an analytics engine may utilize artificial neural networks to identify patterns and predict performance outcomes based on data collected from the network. An analytics engine may be housed on one device, or may be distributed amongst multiple devices.

As referred to herein, a "user interface" may comprise a human-computer interaction and communication in a device, and may include display screens, keyboards, a mouse, and the appearance of a desktop. For example, a user interface may comprise a way a user interacts with an application or a website.

In reference to FIG. 1, server 104 may receive a first change request at a first time, from a first device, for example client devices 102, for a first feature of a plurality of features for a mobile application. In response to receiving the first change request, the system may determine a first metadata information for the first feature. For example, the first metadata information may comprise a first configuration of activation states of features in the computer network, and a first performance metric corresponding to a net system throughput for the computer network at the first time of the first change request. Determining the first performance metric may comprise receiving a first net system throughput at the first time and comparing the first net system throughput to an average net system throughput across the computer network. The system may then generate a first feature change record in a feature database for the plurality of features, wherein the first feature change record may be populated with a first columnar data structure, and wherein the columnar data structure may comprise the first metadata information. The system may then receive a user request, for example via a user interface, from a second device, for example analytics engine 106, to determine a second performance metric corresponding to a second net system throughput that is higher than the first performance metric. Analytics engine 106 may then process the user request using the feature database by determining a second feature change record in the feature database, wherein the second feature change record may be populated with a second columnar data structure. The columnar data structure may comprise a second metadata information, wherein the second metadata information may comprise the second performance metric, and wherein the second feature change record may have been generated after the first feature change record in response to receiving a second change request at a second time. In response to determining that the second metadata information comprises the second performance metric, the system may determine a second configuration of activation states of features in the computer network based on the second metadata information; and generate a recommendation for the second configuration corresponding to the second performance metric for display on the user interface. The recommendation may include an option to activate the second configuration or revert to the first configuration corresponding to the first performance metric.

FIG. 2 shows illustrative data structures for the feature database 200, in accordance with one or more embodiments. A feature database is an organized collection of data relating to distributed application features that can be stored and accessed electronically in a computer network. For example, feature database 200 includes one or more feature change records, such as feature change record 202, 204 and 206. In some embodiments, a feature change record, for example 202, is generated upon a request by a device, for example client device 102, and transmitted to analytics engine 106 by a server, for example server 104. For instance, the feature change record may contain metadata information, for example elements 208-214 taken as a whole, that may be in the form of columnar data structures, that could include a temporal identifier to identify the time of the change request derived from a system clock setting, a performance metric, and a configuration of activation states of features in the computer network. By including metadata information in the feature change record, information that conventional audit logs omit is stored in an asynchronous fashion, allowing for retrospective advanced analytics carried out on features across the computer network as a whole that were not possible in conventional audit logs.

The system may contain features. As referred to herein, a "feature" may be understood to mean a distinguishing characteristic of a software item, for example performance, portability, or functionality. For example, a functionality relating to the execution of a particular task, such as sending a packet of information, a signal, or a file to an external device, may constitute a feature. Other examples of functionalities which may constitute a feature could be a task related to the execution of code, or the calculation of a value given inputs.

The system may contain metadata information relating to a feature. As referred to herein, "metadata information" may include data that provides information about data related to a change made in the system. The metadata information may comprise a first configuration of activation states of features in the computer network, and a first performance metric for the computer network at the first time of the first change request. In some embodiments, the metadata information may comprise a temporal identifier. In some embodiments, the metadata information may comprise a performance metric related to the computer network. By including configuration, performance and temporal information in the metadata, advanced analytics may be applied to correlate the configuration relating to features in the computer network with performance and time data, in order to provide recommendations for the computer network, in order to improve its performance.

The metadata information may include a temporal identifier. As referred to herein, a "temporal identifier" may include a marker of a time of an event taking place. In some embodiments, a determining of the temporal identifier comprises receiving a first system clock setting for the first time, wherein the first system clock setting comprises a standardized setting for recording temporal identifiers across the computer network and recording the first system clock setting as the first temporal identifier. By including temporal information, the computer network may correlate information across features by time, allowing for advanced analytics dependent on any sequence of change requests in the computer network in a way that allows for an asynchronous analysis.

The system may use a configuration of activation states. In some embodiments, the configuration of activation states of features may comprise a list of features, for example 212, 220 or 228, and a list of activation states, for example 214, 222 or 230, which correspond to each feature on the list of features, wherein an activation state comprises a Boolean value, such as "on" and "off" corresponding to "true" and "false". By including this configuration of features, detailing which features are active and which are inactive, analysis and correlations relating to the combination of features that are active in the system may be enabled, improving the effectiveness of analytics carried out on the computer network.

The system may use a performance metric, for example 210, 218 or 226. As referred to herein, a "performance metric" may comprise any quantitative and/or qualitative assessment of performance. For example, a performance metric may relate to the performance of one or more devices and/or the computer network as a whole. Furthermore, the performance metric may be determined as a function of another value and/or at another time. For example, the system may determine a performance metric of a device, network, etc. at a first time as a function of another performance metric of the same or different device, network, etc. at a different time. In some embodiments, the performance metric may comprise an indication of net power consumption across the computer network, wherein determining the performance metric comprises receiving a first net power consumption at a first time and comparing the first net power consumption to an average net power consumption across the computer network. In this case, power consumption may be monitored and analyzed, and a subsequent recommendation may be made to improve the system's efficiency. In some embodiments, determining the performance metric may comprise receiving a first net system throughput at the first time and comparing the first net system throughput to an average net system throughput across the computer network. In this case, deriving the performance metric from system throughput information may aid in optimizing usage of the features of the computer network. Additionally or alternatively, in some embodiments, determining the performance metric may comprise receiving a first memory usage across the computer network at the first time, and comparing the first memory usage to an average memory usage across the computer network. Deriving the performance metric from memory usage information may assist with advanced analytics related to distributing memory resources across the computer network based on changes to enabled features in a way that a traditional audit trail does not allow.

Figure 3:
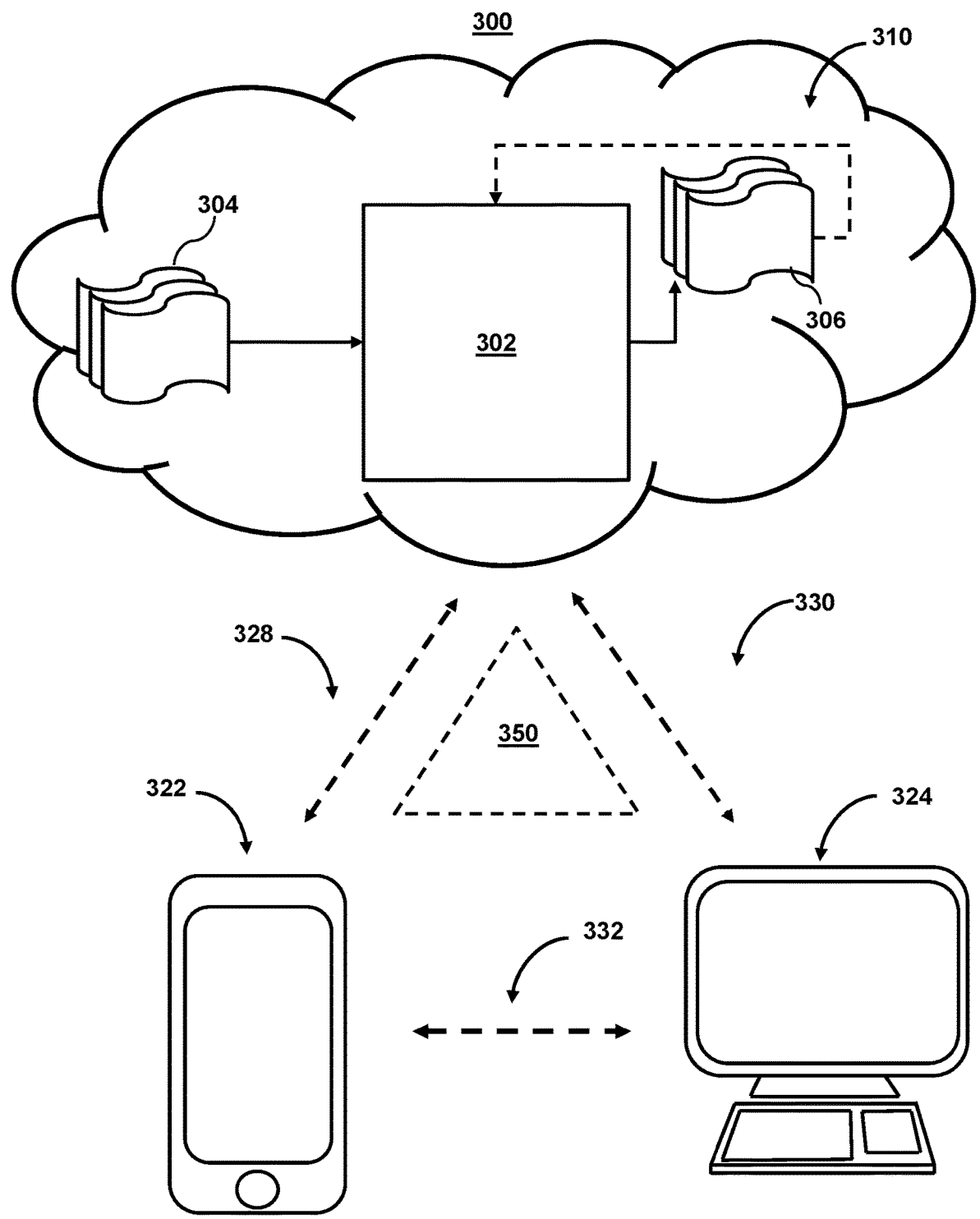
FIG. 3 shows illustrative components for a system used to perform advanced analytics based on which features are active by correlating information based on temporal identifiers in feature databases, in accordance with one or more embodiments.

FIG. 3 shows illustrative components for a system used to perform advanced analytics based on which features are active by correlating information based on temporal identifiers in feature databases in accordance with one or more embodiments. For example, FIG. 3 may show illustrative components for a system that may correlate performance information, such as statistics related to net power consumption throughout the network, based on the temporal identifier, where a conventional audit log may only provide information about one feature's status. The system could then generate a recommendation to alter the system's configuration, for example which features are active, in order to control the performance of the system.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include feature database 200, wherein the feature database may contain one or more feature change records 202, 204 or 206, for example. The feature change records may comprise a configuration of activation states of features 212-214 or 220-222 or 228-230. The configuration of activation states of features may comprise a list of features, for example 212, 220 or 228, and a list of activation states corresponding to each feature of the list of features, for example 214, 222 or 230. The feature change records may comprise a temporal identifier 208, 216 or 224, or a performance metric 218.

Cloud components 310 may access any data regarding features that are enabled in the system. Cloud components 310 may additionally or alternatively access information regarding system throughput, power consumption, system clock settings or memory usage throughout the system or within components of the system. All of the aforementioned data may also be provided as a function of time, in some cases asynchronously.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., recommendations for configurations of activation states of features, in order to achieve particular performance metrics or other system outcomes).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a particular configuration of activation states leads to a particular performance metric above a threshold set by the system requirements).

In some embodiments, the model (e.g., model 302) may automatically perform actions based on outputs 306. In some embodiments, the model (e.g., model 302) may not perform any actions. The output of the model (e.g., model 302) may be used to recommend further configurations that may satisfy any system requirements, for example, performance. For example, the output of the model might be used to determine a configuration that allows for a reduction in net memory usage across the system.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
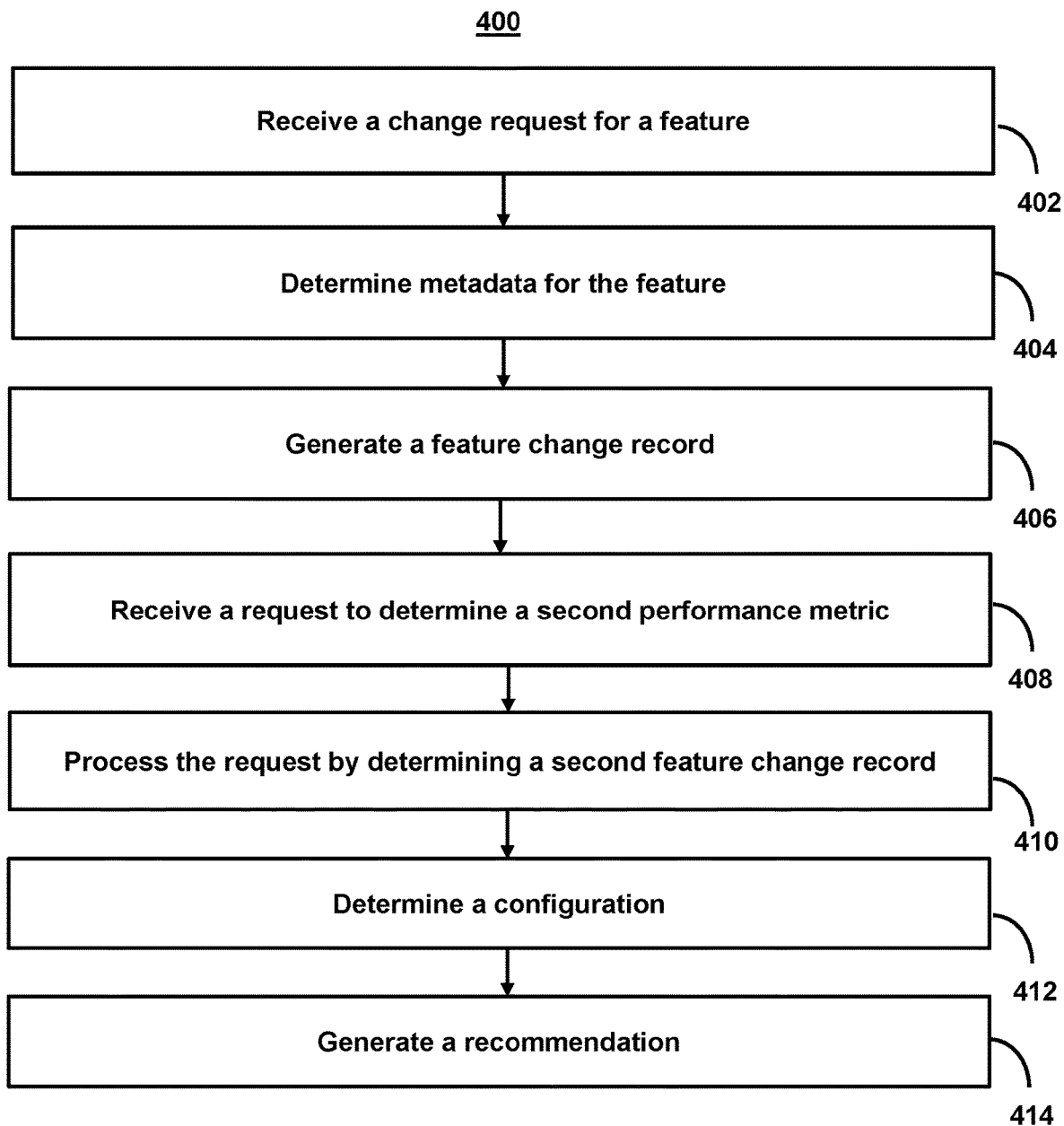
FIG. 4 shows a flowchart of the steps involved in logging and processing change requests in a way that enables advanced analytics, in accordance with one or more embodiments.

FIG. 4 shows a flowchart of the steps involved in logging and processing change requests in a way that enables advanced analytics, in accordance with one or more embodiments. For example, the system may use process 400 (e.g., as implemented on one or more system components described above) in order to allow the system to run advanced analytics based on which features are active by correlating performance information based on the temporal identifier.

At step 402 (e.g., using one or more components described above), process 400 receives a change request for a feature. For example, the system may receive a first change request at a first time, from a device in a computer network, for a first feature of a plurality of features. For instance, this change request may involve a signal to the server to deactivate a particular feature in the computer network. By receiving such a change request, the system may then implement the change in a way that modifies the functionality of an application in a useful manner.

At step 404 (e.g., using one or more components described above), process 400 determines metadata information relating to the feature. For example, the process, in response to receiving the first change request, may determine first metadata information for the first feature, wherein the first metadata information comprises a first configuration of activation states of features in the computer network, and a first performance metric for the computer network at the first time of the first change request. In a practical embodiment, this step may involve recording information of related to a request to change certain features of the computer network. Recording this metadata information for the change then allows the system to perform a myriad of analysis techniques when combined with other data in a feature database in other steps.

In some embodiments, determining the first performance metric may comprise receiving a first net system throughput at the first time, and comparing the first net system throughput to an average net system throughput across the computer network. For example, the system may, in response to receiving the first change request, determine first metadata information for the first feature, wherein the first metadata information comprises a first configuration of activation states of features in the computer network, and a first performance metric corresponding to a net system throughput for the computer network at the first time of the first change request, wherein determining the first performance metric comprises receiving a first net system throughput at the first time, and comparing the first net system throughput to an average net system throughput across the computer network. By making such a comparison, the process may aid in collecting information about and optimizing throughput statistics over the features of the computer network. By including such information in the metadata information, the system may perform an analysis by comparing other configurations' performance with this first configuration's performance, allowing for more advanced decision-making and recommendations.

In some embodiments, the first performance metric may be related to net power consumption instead or in addition. For example, the first performance metric may comprise an indication of net power consumption across the computer network, wherein determining the first performance metric comprises receiving a first net power consumption at the first time, and comparing the first net power consumption to an average net power consumption across the computer network. This inclusion of power consumption information provides the utility of capturing patterns correlating the activation of features to power consumption in the system. As a result, the system can provide utility by allowing for further control over the power efficiency of the computer network.

Additionally or alternatively, in some embodiments, the first performance metric may be related to memory usage in the computer network. For example, the first performance metric comprises an indication net memory use across the computer network, wherein determining the first performance metric comprises receiving a first memory usage across the computer network at the first time and comparing the first memory usage to an average memory usage across the computer network. By including memory usage statistics in the performance metric, the system enables further analysis of the usage of memory resources in a way that a conventional audit trail does not allow. In this manner, the system can allow for improved management of memory and data resources throughout the computer network.

Additionally, or alternatively, in some embodiments, the first configuration information included in the first metadata information may comprise a list of features and corresponding activation states. For example, the first configuration of activation states of features in the computer network may comprise a first list of features and a first list of activation states corresponding to each feature on the first list of features, wherein an activation state comprises a Boolean value. Inclusion of this first configuration of activation states of features allows for information to be collected on the state of all the features in the system, aiding in the advanced analytics that may be performed in subsequent steps. In generating information about the status of all features in the network and not simply features that are actively being changed, a more advanced analysis of the correlations across features in the computer network may be carried out.

Additionally or alternatively, in some embodiments, a temporal identifier is included in the first metadata information. For example, the first metadata information may comprise a first temporal identifier, wherein determining the first temporal identifier comprises receiving a first system clock setting for the first time, wherein the first system clock setting comprises a standardized setting for recording temporal identifiers across the computer network and recording the first system clock setting at the first temporal identifier. By marking each change request with a temporal identifier, the system may not only provide the features of a conventional audit log, but may then allow for an analysis across multiple feature change records over multiple features, which allows for a more extensive analysis of relationships between different features.

At step 406 (e.g., using one or more components described above), process 400 generates a first feature change record within a feature database. For example, the process may generate a first feature change record in a feature database for the plurality of features, wherein the first feature change record is populated with the first metadata information. The inclusion of additional metadata information allows for an expanded collection of data compared to a conventional audit log, which may only track timestamps and individual changes to individual features that are made. By including metadata information as well in the feature change records, the system allows for additional data to be processed and analyzed in subsequent steps.

In some embodiments, the first feature change record in the feature database for the plurality features may be populated with a first columnar data structure, wherein the columnar data structure comprises the first metadata information, as depicted for illustrative purposes in FIG. 2. By using columnar data structures, the system may perform advanced analytics by providing a modular, portable form for metadata information that readily converts to other file formats.

At step 408 (e.g., using one or more components described above), process 400 receives a request to determine a second performance metric. For example, the step may comprise receiving a user request, via a user interface, from a second device in the computer network, to determine a second performance metric that is higher than the first performance metric. Determining a higher performance metric allows the system to determine a new configuration in step 412, for which a recommendation may be made subsequently in step 414. In some embodiments, the second performance metric corresponds to a second net system throughput that is higher than the first performance metric. By doing so, the system may enable identification of a configuration that provides a second net system throughput corresponding to a higher performance metric.

At step 410 (e.g., using one or more components described above), process 400 processes the user request by determining a second feature change record. For example, the system may process the user request using the feature database by determining a second feature change record in the feature database, wherein the second feature change record comprises second metadata information, and wherein the second metadata information comprises the second performance metric, and wherein the second feature change record was generated after a first feature change record in response to receiving a second change request at a second time. The second feature change record may include a record for a change that is linked to a higher system throughput-related performance metric and, by finding the record related to this performance metric, a configuration with higher performance may be achieved in the network. In this way, this process allows for an analysis beyond a conventional audit trail, where the system is not required to determine an alternate configuration at each time and/or for each feature, and where the system is not required to determine respective performance information.

In some embodiments, the second feature change record is populated with a second columnar data structure containing the second metadata information. For example, the second feature change record may be populated with a second columnar data structure, wherein the columnar data structure comprises a second metadata information, wherein the second metadata information may comprise the second performance metric, wherein the second feature change record may have been generated after the first feature change record in response to receiving a second change request at a second time. Again, by using columnar data structures, further advanced analytics to be performed on the system are aided by providing a modular, portable form for metadata information that readily converts to other file formats.

In some embodiments, determining the second feature change record may involve retrieving many performance metrics and filtering the performance metrics for higher performance metrics. For example, determining the second feature change record in the feature database may comprise retrieving a plurality of respective performance metrics for a plurality of feature change records and filtering the plurality of respective performance metrics for performance metrics higher than the first performance metrics. By doing so, the subsequent task of generating a recommendation for a new configuration may be streamlined by discarding some feature change records that are not appropriate, while only considering a subset of feature change records. This filtering process allows the system to reduce data requirements and improve analysis efficiency.

In some embodiments, determining the second feature change record may further involve generating a ranking of performance metrics that are higher than the first performance metric, and selecting a new performance metric based on the ranking. For example, determining the second feature change record in the feature database may comprise generating a ranking of the plurality of respective performance metrics that are higher than the first performance metric, and selecting the second performance metric based on the ranking. By doing so, the system may target a performance metric commensurate to any requirements in a specific, deterministic way, which allows the system to process the feature change records in a useful way.

At step 412 (e.g., using one or more components described above), process 400 determines a second configuration in the computer network, in response to determining second metadata information. For example, in response to determining that the second metadata information comprises the second performance metric, the system may determine a second configuration of activation states of features in the computer network based on the second metadata information. For example, in response to identifying the metadata information that comprises the performance metric found in step 310, for example a higher performance metric corresponding to net memory usage, the system may then identify a configuration of features that corresponds to this higher performance metric. By doing so, the system processes the information across the feature change records within the feature database and pinpoints a particular configuration that the system could change to in order to effect this change and achieve this second performance metric. This step is a manner by which the system may perform analytics on the computer network in order to subsequently generate a recommendation.

At step 414 (e.g., using one or more components described above), process 400 generates a recommendation based on the prior determination. For example, the system may generate a recommendation for the second configuration corresponding to the second performance metric for display on the user interface, wherein the recommendation includes an option to activate the second configuration or revert to the first configuration corresponding to the first performance metric. In this way, when a higher performance metric has been found, and subsequently the configuration corresponding to this performance metric has also been determined, the system may generate a recommendation for the configuration that may achieve this performance metric and display it on a user interface in order for a decision to be made. By doing so, the analytics performed in determining this configuration may be applied to maintaining and improving the computer network, through this generation of a display of the recommendation.

In some embodiments, generating the recommendation may comprise calculating a percentage difference between the performance metrics and displaying a list of feature differences, activation state differences and the percentage difference. For example, generating the recommendation for the second configuration of activation states, for display on the user interface, may comprise calculating a percentage difference between the second performance metric and the first performance metric, generating a list of feature differences, wherein the list of feature differences comprises a list of differences between a first set of features within the first list of features and a second set of features within a second list of features corresponding to the second configuration of activation states, generating a list of activation state differences, wherein the list of activation state differences comprises a list of differences between the activation states within the first list of activation states corresponding to the first configuration of activation states, and the activation states within a second list of activation states corresponding to the second configuration of activation states, and generating for display the percentage difference between the second performance metric and the first performance metric, the list of feature differences, and the list of activation state differences on the user interface. In generating the recommendation, the system may also compare the performance of the old configuration with the performance of the new configuration, and display not only the performance difference, but how the configuration differs as well. By doing so, information about the possible causes behind a change in performance metrics due to a change in configuration may be generated, perhaps for further analytics and causality determination.

In some embodiments, generating the recommendation may be such that the recommendation includes an option to activate the second configuration, or revert to the original configuration. For example, the system may generate a recommendation for the second configuration corresponding to the second performance metric for display on the user interface, wherein the recommendation includes an option to activate the second configuration or revert to the first configuration corresponding to the first performance metric. In this way, in reviewing the recommendation generated, an action may be taken regarding whether to maintain the change that was requested or revert to the original configuration prior to the change. By doing so, the process provides useful, actionable consequences that may allow the system to improve its performance or stability and provides more control over the features within the computer network.

In some embodiments, process 400 may further include receiving a third change request, determining a third metadata information for the first feature, and generating a third feature change record. For example, the system may further receive a third change request at a third time, from the first device in the computer network, for the first feature. In response to receiving the third change request, the system may determine a third metadata information for the first feature, wherein the third metadata information comprises a third configuration of activation states of features in the computer network, and a third performance metric for the computer network at the third time of the third change request, and the system may generate a third feature change record in the feature database for the plurality of features, wherein the third feature change record is populated with the third metadata information. In carrying out these extra steps, the process allows for an analysis that acts as a test to elucidate the consequences of reverting the computer network to its original configuration. This limitation would allow for a further analysis of the effects of a given change request on a system, and, thus, may assist in further analytics of the effect of the features on the performance of the computer network.

It is contemplated that the steps or descriptions of FIG. 4 may be used with any other embodiment of this disclosure. In addition, the steps and descriptions described in relation to FIG. 3 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for performing advanced analytics based on which features are active by correlating information based on temporal identifiers in feature databases, the method comprising: receiving a first change request at a first time, from a first device in a computer network, for a first feature of a plurality of features; in response to receiving the first change request, determining first metadata information for the first feature, wherein the first metadata information comprises a first configuration of activation states of features in the computer network, and a first performance metric for the computer network at the first time of the first change request; generating a first feature change record in a feature database for the plurality of features, wherein the first feature change record is populated with the first metadata information; receiving a user request, via a user interface, from a second device in the computer network, to determine a second performance metric that is higher than the first performance metric; processing the user request using the feature database by determining a second feature change record in the feature database, wherein the second feature change record comprises second metadata information, and wherein the second metadata information comprises the second performance metric, and wherein the second feature change record was generated after a first feature change record in response to receiving a second change request at a second time; in response to determining that the second metadata information comprises the second performance metric, determining a second configuration of activation states of features in the computer network based on the second metadata information; and generating a recommendation for the second configuration for display on the user interface.

2. The method of the preceding embodiment, wherein the first configuration of activation states of features in the computer network comprises: a first list of features; and a first list of activation states corresponding to each feature on the first list of features, wherein an activation state comprises a Boolean value.

3. The method of any one of the preceding embodiments, wherein the first performance metric comprises an indication of net power consumption across the computer network, and wherein determining the first performance metric comprises: receiving a first net power consumption at the first time; and comparing the first net power consumption to an average net power consumption across the computer network.

4. The method of any one of the preceding embodiments, wherein the first performance metric comprises an indication of net system throughput across the computer network, and wherein determining the first performance metric comprises: receiving a first net system throughput across the computer network at the first time; and comparing the first net system throughput to an average net system throughput across the computer network.

5. The method of any one of the preceding embodiments, wherein the first performance metric comprises an indication of net memory use across the computer network, and wherein determining the first performance metric comprises: receiving a first memory usage across the computer network at the first time; and comparing the first memory usage to an average memory usage across the computer network.

6. The method of any one of the preceding embodiments, wherein the first metadata information comprises a first temporal identifier, wherein determining the first temporal identifier comprises: receiving a first system clock setting for the first time, wherein the first system clock setting comprises a standardized setting for recording temporal identifiers across the computer network; and recording the first system clock setting at the first temporal identifier.

7. The method of any one of the preceding embodiments, wherein determining the second feature change record in the feature database comprises: retrieving a plurality of respective performance metrics for a plurality of feature change records; and filtering the plurality of respective performance metrics for performance metrics higher than the first performance metric.

8. The method of any one of the preceding embodiments, wherein determining the second feature change record in the feature database comprises: generating a ranking of the plurality of respective performance metrics that are higher than the first performance metric; and selecting the second performance metric based on the ranking.

9. The method of any one of the preceding embodiments, further comprising: receiving a third change request at a third time, from the first device in the computer network, for the first feature; in response to receiving the third change request, determining a third metadata information for the first feature, wherein the third metadata information comprises a third configuration of activation states of features in the computer network, and a third performance metric for the computer network at the third time of the third change request; and generating a third feature change record in the feature database for the plurality of features, wherein the third feature change record is populated with the third metadata information.

10. The method of any one of the preceding embodiments, wherein generating the recommendation for the second configuration of activation states, for display on the user interface, comprises: calculating a percentage difference between the second performance metric and the first performance metric; generating a list of feature differences, wherein the list of feature differences comprises a list of differences between a first set of features within the first list of features and a second set of features within a second list of features corresponding to the second configuration of activation states; generating a list of activation state differences, wherein the list of activation state differences comprises a list of differences between the activation states within the first list of activation states corresponding to the first configuration of activation states, and the activation states within a second list of activation states corresponding to the second configuration of activation states; and generating for display the percentage difference between the second performance metric and the first performance metric, the list of feature differences, and the list of activation state differences, on the user interface.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for performing advanced analytics based on which features are active by correlating information based on temporal identifiers in feature databases, the system comprising:
one or more processors; and
a non-transitory computer-readable medium comprising instructions recorded thereon that when executed by the one or more processors cause operations comprising:
receiving a first change request at a first time, from a first device in a computer network, for a first feature of a plurality of features for a mobile application;
in response to receiving the first change request, determining first metadata information for the first feature, wherein the first metadata information comprises a first configuration of activation states of features in the computer network, and a first performance metric corresponding to a net system throughput for the computer network at the first time of the first change request, wherein determining the first performance metric comprises receiving a first net system throughput at the first time, and comparing the first net system throughput to an average net system throughput across the computer network;
generating a first feature change record in a feature database for the plurality of features, wherein the first feature change record is populated with a first columnar data structure, wherein the first columnar data structure comprises the first metadata information;
receiving a user request, via a user interface, from a second device in the computer network, to determine a second performance metric corresponding to a second net system throughput that is higher than the first performance metric;
processing the user request using the feature database by determining a second feature change record in the feature database, wherein the second feature change record is populated with a second columnar data structure, wherein the second columnar data structure comprises a second metadata information, wherein the second metadata information comprises the second performance metric, and wherein the second feature change record was generated after the first feature change record in response to receiving a second change request at a second time;
in response to determining that the second metadata information comprises the second performance metric, determining a second configuration of activation states of features in the computer network based on the second metadata information; and
generating a recommendation for the second configuration corresponding to the second performance metric for display on the user interface, wherein the recommendation includes an option to activate the second configuration or revert to the first configuration corresponding to the first performance metric.

2. A method for performing advanced analytics based on which features are active by correlating information based on temporal identifiers in feature databases, the method comprising:
receiving a first change request at a first time, from a first device in a computer network, for a first feature of a plurality of features;
in response to receiving the first change request, determining first metadata information for the first feature, wherein the first metadata information comprises a first configuration of activation states of features in the computer network, and a first performance metric for the computer network at the first time of the first change request;
generating a first feature change record in a feature database for the plurality of features, wherein the first feature change record is populated with the first metadata information;
receiving a user request, via a user interface, from a second device in the computer network, to determine a second performance metric that is higher than the first performance metric;
processing the user request using the feature database by determining a second feature change record in the feature database, wherein the second feature change record comprises second metadata information, and wherein the second metadata information comprises the second performance metric, and wherein the second feature change record was generated after the first feature change record in response to receiving a second change request at a second time;

in response to determining that the second metadata information comprises the second performance metric, determining a second configuration of activation states of features in the computer network based on the second metadata information; and generating a recommendation for the second configuration for display on the user interface, wherein the recommendation includes an option to activate the second configuration or revert to the first configuration corresponding to the first performance metric.

3. The method of claim 2, wherein the first configuration of activation states of features in the computer network comprises:

a first list of features; and a first list of activation states corresponding to each feature on the first list of features, wherein an activation state comprises a Boolean value.

4. The method of claim 3, wherein generating the recommendation for the second configuration of activation states, for display on the user interface, comprises:

calculating a percentage difference between the second performance metric and the first performance metric;

generating a list of feature differences, wherein the list of feature differences comprises a list of differences between a first set of features within the first list of features and a second set of features within a second list of features corresponding to the second configuration of activation states;

generating a list of activation state differences, wherein the list of activation state differences comprises a list of differences between activation states within the first list of activation states corresponding to the first configuration of activation states, and activation states within a second list of activation states corresponding to the second configuration of activation states; and generating for display the percentage difference between the second performance metric and the first performance metric, the list of feature differences, and the list of activation state differences, on the user interface.

5. The method of claim 2, wherein the first performance metric comprises an indication of net power consumption across the computer network, and wherein determining the first performance metric comprises:

receiving a first net power consumption at the first time; and comparing the first net power consumption to an average net power consumption across the computer network.

6. The method of claim 2, wherein the first performance metric comprises an indication of net system throughput across the computer network, and wherein determining the first performance metric comprises:

receiving a first net system throughput across the computer network at the first time; and comparing the first net system throughput to an average net system throughput across the computer network.

7. The method of claim 2, wherein the first performance metric comprises an indication of net memory use across the computer network, and wherein determining the first performance metric comprises:

receiving a first memory usage across the computer network at the first time; and comparing the first memory usage to an average memory usage across the computer network.

8. The method of claim 2, wherein the first metadata information comprises a first temporal identifier, wherein determining the first temporal identifier comprises:

receiving a first system clock setting for the first time, wherein the first system clock setting comprises a standardized setting for recording temporal identifiers across the computer network; and recording the first system clock setting at the first temporal identifier.

9. The method of claim 2, wherein determining the second feature change record in the feature database comprises:

retrieving a plurality of respective performance metrics for a plurality of feature change records; and filtering the plurality of respective performance metrics for performance metrics higher than the first performance metric.

10. The method of claim 9, wherein determining the second feature change record in the feature database comprises:

generating a ranking of the plurality of respective performance metrics that are higher than the first performance metric; and selecting the second performance metric based on the ranking.

11. The method of claim 2, further comprising:

receiving a third change request at a third time, from the first device in the computer network, for the first feature;

in response to receiving the third change request, determining a third metadata information for the first feature, wherein the third metadata information comprises a third configuration of activation states of features in the computer network, and a third performance metric for the computer network at the third time of the third change request; and generating a third feature change record in the feature database for the plurality of features, wherein the third feature change record is populated with the third metadata information.

12. One or more non-transitory, computer-readable media comprising instructions that, when executed on one or more processors, causes operations comprising:

receiving a first change request at a first time, from a first device in a computer network, for a first feature of a plurality of features;

in response to receiving the first change request, determining first metadata information for the first feature, wherein the first metadata information comprises a first configuration of activation states of features in the computer network, and a first performance metric for the computer network at the first time of the first change request;

generating a first feature change record in a feature database for the plurality of features, wherein the first feature change record is populated with the first metadata information;

receiving a user request, via a user interface, from a second device in the computer network, to determine a second performance metric that is higher than the first performance metric;

processing the user request using the feature database by determining a second feature change record in the feature database, wherein the second feature change record comprises second metadata information, and wherein the second metadata information comprises the second performance metric, and wherein the second feature change record was generated after the first feature change record in response to receiving a second change request at a second time;

in response to determining that the second metadata information comprises the second performance metric, determining a second configuration of activation states of features in the computer network based on the second metadata information; and generating a recommendation for the second configuration for display on the user interface, wherein the recommendation includes an option to activate the second configuration or revert to the first configuration corresponding to the first performance metric.

13. The one or more non-transitory, computer-readable media of claim 12, wherein the first configuration of activation states of features in the computer network comprises:
a first list of features; and
a first list of activation states corresponding to each feature on the first list of features, wherein an activation state comprises a Boolean value.

14. The one or more non-transitory, computer-readable media of claim 13, wherein generating the recommendation for the second configuration of activation states, for display on the user interface, comprises:
calculating a percentage difference between the second performance metric and the first performance metric;
generating a list of feature differences, wherein the list of feature differences comprises a list of differences between a first set of features within the first list of features and a second set of features within a second list of features corresponding to the second configuration of activation states;
generating a list of activation state differences, wherein the list of activation state differences comprises a list of differences between activation states within the first list of activation states corresponding to the first configuration of activation states, and activation states within a second list of activation states corresponding to the second configuration of activation states; and
generating for display the percentage difference between the second performance metric and the first performance metric, the list of feature differences, and the list of activation state differences, on the user interface.

15. The one or more non-transitory, computer-readable media of claim 12, wherein the first performance metric comprises an indication of net power consumption across the computer network, and wherein determining the first performance metric comprises:

receiving a first net power consumption at the first time; and
comparing the first net power consumption to an average net power consumption across the computer network.

16. The one or more non-transitory, computer-readable media of claim 12, wherein the first performance metric comprises an indication of net system throughput across the computer network, and wherein determining the first performance metric comprises:
receiving a first net system throughput across the computer network at the first time; and
comparing the first net system throughput to an average net system throughput across the computer network.

17. The one or more non-transitory, computer-readable media of claim 12, wherein the first performance metric comprises an indication of net memory use across the computer network, and wherein determining the first performance metric comprises:
receiving a first memory usage across the computer network at the first time; and
comparing the first memory usage to an average memory usage across the computer network.

18. The one or more non-transitory, computer-readable media of claim 12, wherein the first metadata information comprises a first temporal identifier, wherein determining the first temporal identifier comprises:
receiving a first system clock setting for the first time, wherein the first system clock setting comprises a standardized setting for recording temporal identifiers across the computer network; and
recording the first system clock setting at the first temporal identifier.

19. The one or more non-transitory, computer-readable media of claim 12, wherein determining the second feature change record in the feature database comprises:
retrieving a plurality of respective performance metrics for a plurality of feature change records; and
filtering the plurality of respective performance metrics for performance metrics higher than the first performance metric.

20. The one or more non-transitory, computer-readable media of claim 19, wherein determining the second feature change record in the feature database comprises:
generating a ranking of the plurality of respective performance metrics that are higher than the first performance metric; and
selecting the second performance metric based on the ranking.

* * * * *